United States Patent
Zhang

(10) Patent No.: US 9,131,583 B2
(45) Date of Patent: Sep. 8, 2015

(54) LED BACKLIGHT DRIVE CIRCUIT

(71) Applicant: Shenzhen China Star Optoelectronics Technology Co., LTD., Shenzhen, Guangdong Province (CN)

(72) Inventor: Hua Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 163 days.

(21) Appl. No.: 13/824,390

(22) PCT Filed: Mar. 5, 2013

(86) PCT No.: PCT/CN2013/072199
§ 371 (c)(1),
(2) Date: Mar. 18, 2013

(87) PCT Pub. No.: WO2014/131203
PCT Pub. Date: Sep. 4, 2014

(65) Prior Publication Data
US 2014/0246979 A1  Sep. 4, 2014

(51) Int. Cl.
*H05B 33/08* (2006.01)

(52) U.S. Cl.
CPC .......... *H05B 33/089* (2013.01); *H05B 33/0815* (2013.01); *Y02B 20/341* (2013.01)

(58) Field of Classification Search
None
See application file for complete search history.

(56) References Cited

U.S. PATENT DOCUMENTS

| | | | | |
|---|---|---|---|---|
| 7,276,863 | B2* | 10/2007 | Lee et al. | 315/307 |
| 8,344,656 | B2* | 1/2013 | Du et al. | 315/297 |
| 8,547,026 | B2* | 10/2013 | Lin et al. | 315/192 |
| 8,598,807 | B2* | 12/2013 | Ji et al. | 315/294 |
| 8,754,579 | B2* | 6/2014 | Kanemitsu et al. | 315/119 |
| 8,890,423 | B2* | 11/2014 | Hu et al. | 315/186 |
| 8,896,230 | B1* | 11/2014 | Zhang | 315/291 |

(Continued)

FOREIGN PATENT DOCUMENTS

| | | |
|---|---|---|
| CN | 201142203 Y | 10/2008 |
| CN | 101436386 A | 5/2009 |

(Continued)

OTHER PUBLICATIONS

Linear Technology, 2010, "LTM8042/LTM8042-1 μModule Boost LED Driver and Current Source".*

(Continued)

*Primary Examiner* — Alexander H Taningco
*Assistant Examiner* — Nelson Correa
(74) *Attorney, Agent, or Firm* — Cheng-Ju Chiang

(57) ABSTRACT

The present invention provides an LED backlight drive circuit, which includes a first power supply module, an electrical inductor, a rectifier diode, a MOS transistor, an electrolytic capacitor, an LED light string, a voltage division module, a voltage comparator, a second power supply module, and an LED constant-current drive chip. The LED backlight drive circuit is arranged to include a voltage comparator in an external circuit of the LED constant-current drive chip to detect output voltage of the drive circuit so that high voltage, the voltage comparator is caused to supply a low voltage level to forcibly pull down a PWM dimming signal or an ENA enabling signal of the LED constant-current drive chip to achieve an over-voltage protection function and also enable removal of over-voltage protection module from a conventional LED constant-current drive chip.

7 Claims, 3 Drawing Sheets

(56) References Cited

U.S. PATENT DOCUMENTS 8,912,731 B2 * 12/2014 Zhang et al. .................. 315/224
2009/0295775 A1 12/2009 Kim et al.

FOREIGN PATENT DOCUMENTS

| | | |
|---|---|---|
| CN | 202454225 U | 9/2012 |
| JP | 2009-58857 A | 3/2009 |

OTHER PUBLICATIONS

Linear Technology, 2010, "LTM8042 μModule Boost LED Driver and Current Source" (furnished in first Office action).*

* cited by examiner

LED BACKLIGHT DRIVE CIRCUIT

BACKGROUND OF THE INVENTION

1. Field of the Invention

The present invention relates to the field of backlight driving of liquid crystal display, and in particular to an LED (Light-Emitting Diode) backlight drive circuit that helps reduce the size of an LED constant-current driving chip.

2. The Related Arts

Nowadays, science and technology are in rapid progress and various innovated information devices are available in the market to suit the needs of general people. In early days, displaying devices are mostly CRD (Cathode Ray Tube) displays, which have a bulky size and consumes a large amount of electrical power and generate radiation so that long term use of the displays is hazardous to body health for users. Thus, the displays that are currently available in the market are gradually switched from liquid crystal displays (LCDs) that substitute the CRT displays used in early days.

LCDs have a variety of advantages, such as thin device body, low power consumption, and being free of radiation, and are thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a drive voltage is applied to the two glass substrates to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the location where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby pass through an optic film assembly to form a planar light source for the liquid crystal display panel.

The backlight module comprises a backlight drive circuit that drives an LED light string to emit light so as to provide the backlighting. A conventional backlight drive circuit comprises an LED constant-current driving chip. The LED constant-current driving chip comprises an output over-voltage protection function, whereby when open-circuit of the LED string happens in the circuit, the LED constant-current driving chip detects zero voltage at a negative terminal of the LED light string and the LED constant-current driving chip determines that this is caused by insufficiency of output voltage and will increase the duty ratio of drive signal supplied to MOS transistors. The greater the duty ratio is, the greater the output voltage of the backlight drive circuit will be. Consequently, the output voltage rises. Since the LED light string is open-circuited, the LED constant-current driving chip detects no voltage at the negative terminal of the LED light string and will control the output voltage to unlimitedly rise. If no output over-voltage protection function is provided, the output voltage will get up continuously and will then exceed the durable voltage of the components in a back-side circuit. The components will be break through and even a fire will be caused, resulting in risk of operation safety.

As shown in FIG. 1, an LED constant-current driving chip 10 comprises an output over-voltage protection module 12 that is integrated inside the LED constant-current driving chip 10. The LED constant-current driving chip 10 contains therein a comparator 14. The comparator 14 has a positive input connected to an over-voltage protection (OVP) pin of the LED constant-current driving chip 10 and a negative input connected to constant reference voltage V that is generated by the LED constant-current driving chip 10 when receiving application of electrical power thereto. When an abnormal rise of output voltage occurs, a detection voltage obtained through voltage division realized with resistors R10 and R20 is supplied to the OVP pin to compare with the constant reference voltage V that is supplied to the negative input of the comparator 14 within the LED constant-current driving chip 10. When the detected voltage is greater than the constant reference voltage V, the comparator 14 supplies an output of high level to activate the output over-voltage protection module 12 of the LED constant-current driving chip 10 and cut off a drive signal of a MOS transistor Q10, so that the output voltage of the backlight drive circuit is prevented from further rising and the components of circuits are protected from being broken by high voltage. However, the process shows the following drawbacks:

(1) OVP pin of the LED constant-current driving chip 10 is used and this is adverse to compaction and size reduction of LED constant-current driving chip 10.

(2) When shorting of the division resistor R10 or open-circuiting of the division voltage R20 occurs, the high output voltage will be directly applied to the LED constant-current driving chip 10 and thus damage the LED constant-current driving chip 10.

SUMMARY OF THE INVENTION

Thus, an object of the present invention is to provide a backlight drive circuit, which allows the size of an LED constant-current driving chip to be reduced, lowers the manufacture cost, and better protects the LED constant-current driving chip from the risk of being broken through by high voltage.

To achieve the object, the present invention provides an LED backlight drive circuit, which comprises: a first power supply module, an electrical inductor, a rectifier diode, a MOS transistor, an electrolytic capacitor, an LED light string, a voltage division module, a voltage comparator, a second power supply module, and an LED constant-current drive chip;

the electrical inductor having an end electrically connected to the first power supply module and an opposite end electrically connected to an end of the rectifier diode and the MOS transistor, the rectifier diode having an opposite end electrically connected to the electrolytic capacitor, the voltage division module, and the LED light string, the MOS transistor having an end electrically connected to the LED constant-current drive chip, the voltage division module being electrically connected to the voltage comparator and the second power supply module, the MOS transistor, the electrolytic capacitor, the voltage division module, and the LED light string being electrically connected to a grounding line;

the LED constant-current drive chip comprising an ENA enabling signal pin and a PWM dimming signal pin, the voltage comparator comprising an output pin, the output pin being electrically connected to the ENA enabling signal pin or the PWM dimming signal pin.

The voltage division module comprises: a first electrical resistor and a second electrical resistor. The first electrical resistor has an end electrically connected to the rectifier diode, the electrolytic capacitor, and the LED light string and an opposite end electrically connected to an end of the second electrical resistor and the voltage comparator. The second electrical resistor has an opposite end electrically connected to the grounding line.

The voltage comparator further comprises a positive input pin and a negative input pin. The negative input pin is electrically connected to the opposite end of the first electrical resistor and the end of the second electrical resistor. The positive input pin is electrically connected to the second power supply module.

The rectifier diode comprises an anode and a cathode. The anode is electrically connected to the electrical inductor and the MOS transistor. The cathode is electrically connected to the electrolytic capacitor, the voltage division module, and the LED light string.

The electrolytic capacitor comprises a positive terminal and a negative terminal. The positive terminal is electrically connected to the rectifier diode, the voltage division module, and the LED light string. The negative terminal is electrically connected to the grounding line.

The MOS transistor comprises a gate terminal, a source terminal, and a drain terminal. The drain terminal is electrically connected to the electrical inductor and the rectifier diode. The gate terminal is electrically connected to the LED constant-current drive chip. The source terminal is electrically connected to the grounding line.

The second power supply module is generated by the first power supply module through resistor based voltage division.

The second power supply module s generated by the first power supply module through capacitor based voltage division.

The present invention further provides an LED backlight drive circuit, which comprises: a first power supply module, an electrical inductor, a rectifier diode, a MOS transistor, an electrolytic capacitor, an LED light string, a voltage division module, a voltage comparator, a second power supply module, and an LED constant-current drive chip;
  the electrical inductor having an end electrically connected to the first power supply module and an opposite end electrically connected to an end of the rectifier diode and the MOS transistor, the rectifier diode having an opposite end electrically connected to the electrolytic capacitor, the voltage division module, and the LED light string, the MOS transistor having an end electrically connected to the LED constant-current drive chip, the voltage division module being electrically connected to the voltage comparator and the second power supply module, the MOS transistor, the electrolytic capacitor, the voltage division module, and the LED light string being electrically connected to a grounding line;
  the LED constant-current drive chip comprising an ENA enabling signal pin and a PWM dimming signal pin, the voltage comparator comprising an output pin, the output pin being electrically connected to the ENA enabling signal pin or the PWM dimming signal pin;
  wherein the voltage division module comprises: a first electrical resistor and a second electrical resistor, the first electrical resistor having an end electrically connected to the rectifier diode, the electrolytic capacitor, and the LED light string and an opposite end electrically connected to an end of the second electrical resistor and the voltage comparator, the second electrical resistor having an opposite end electrically connected to the grounding line;
  wherein the voltage comparator further comprises a positive input pin and a negative input pin, the negative input pin being electrically connected to the opposite end of the first electrical resistor and the end of the second electrical resistor, the positive input pin being electrically connected to the second power supply module;
  wherein the rectifier diode comprises an anode and a cathode, the anode being electrically connected to the electrical inductor and the MOS transistor, the cathode being electrically connected to the electrolytic capacitor, the voltage division module, and the LED light string;
  wherein the electrolytic capacitor comprises a positive terminal and a negative terminal, the positive terminal being electrically connected to the rectifier diode, the voltage division module, and the LED light string, the negative terminal being electrically connected to the grounding line;
  wherein the MOS transistor comprises a gate terminal, a source terminal, and a drain terminal, the drain terminal being electrically connected to the electrical inductor and the rectifier diode, the gate terminal being electrically connected to the LED constant-current drive chip, the source terminal being electrically connected to the grounding line; and
  wherein the second power supply module is generated by the first power supply module through resistor based voltage division.

The efficacy of the present invention is that the present invention provides an LED backlight drive circuit, wherein a voltage comparator is included in an external circuit of the LED constant-current drive chip to detect the output voltage of the drive circuit, so that in case of high voltage, the voltage comparator is caused to supply a low voltage level to forcibly pull down a PWM dimming signal or an ENA enabling signal of the LED constant-current drive chip to achieve an over-voltage protection function and also enable removal of over-voltage protection module from a conventional LED constant-current drive chip, allowing the size of the LED constant-current drive chip to be further reduced and lowering down the manufacture cost and better protecting the LED constant-current drive chip against risk of being broken through by high voltage.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

In a backlight drive circuit, to have an LED constant-current drive chip normally operating, Vcc, PWM dimming signal, and ENA enabling signal must be all present. Thus, a simple switching circuit may be added outside the LED constant-current drive chip to control the conduction state of any one of the three signals of Vcc, PWM dimming signal, and ENA enabling signal so as to achieve an over-voltage protection function. When the LED backlight drive circuit supplies an output voltage that is excessively high, any one of these signals can be cut off to effect the over-voltage protection function. In this way, the OVP pin and associated internal integration can be removed from the LED constant-current drive chip, thereby reducing the number of pins of the LED constant-current drive chip, and thus reducing the packaged size of the LED constant-current drive chip and lowering the manufacture cost of the LED constant-current drive chip. The high output voltage will not be directly supplied to the LED constant-current drive chip, so that better protection of the LED constant-current drive chip can be achieved.

Figure 1:
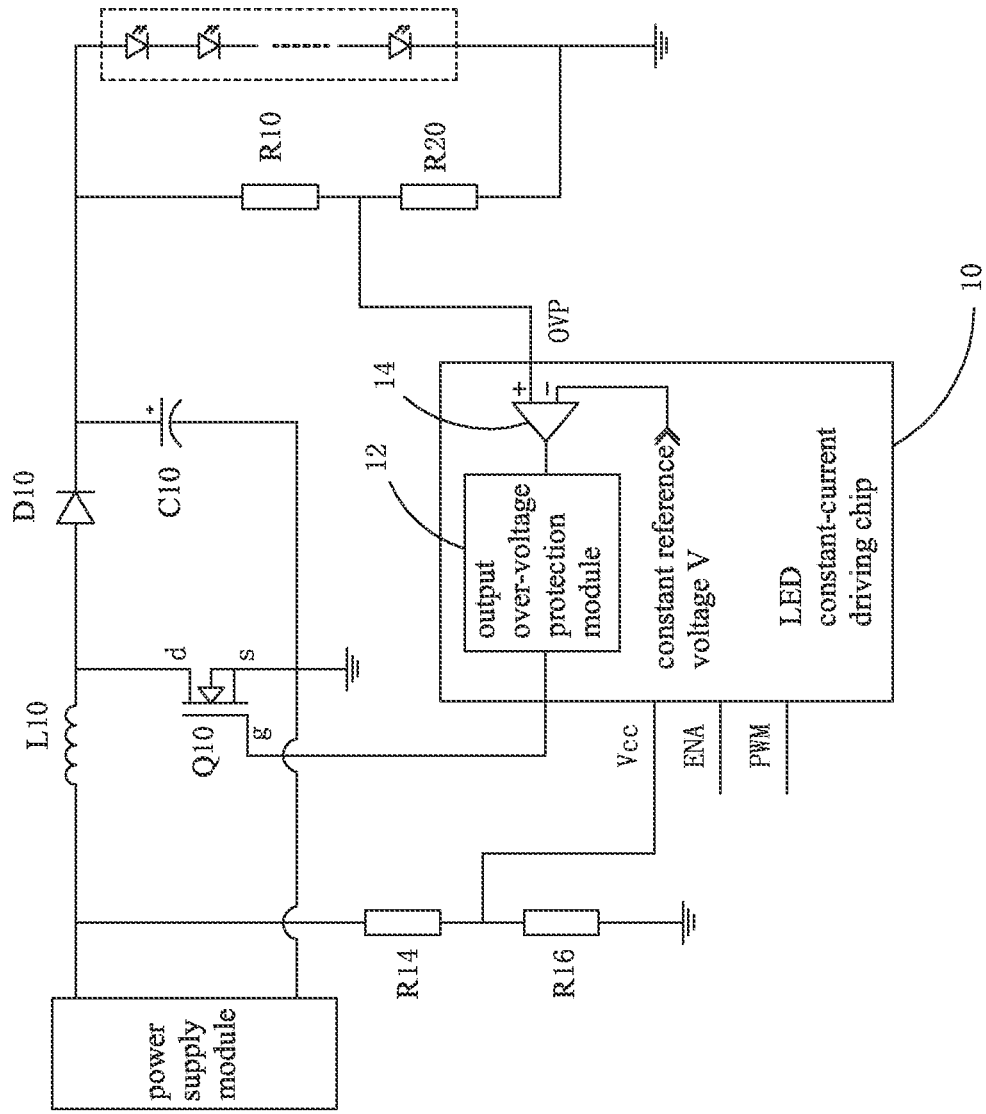
FIG. 1 shows a conventional LED backlight drive circuit.
Figure 2:
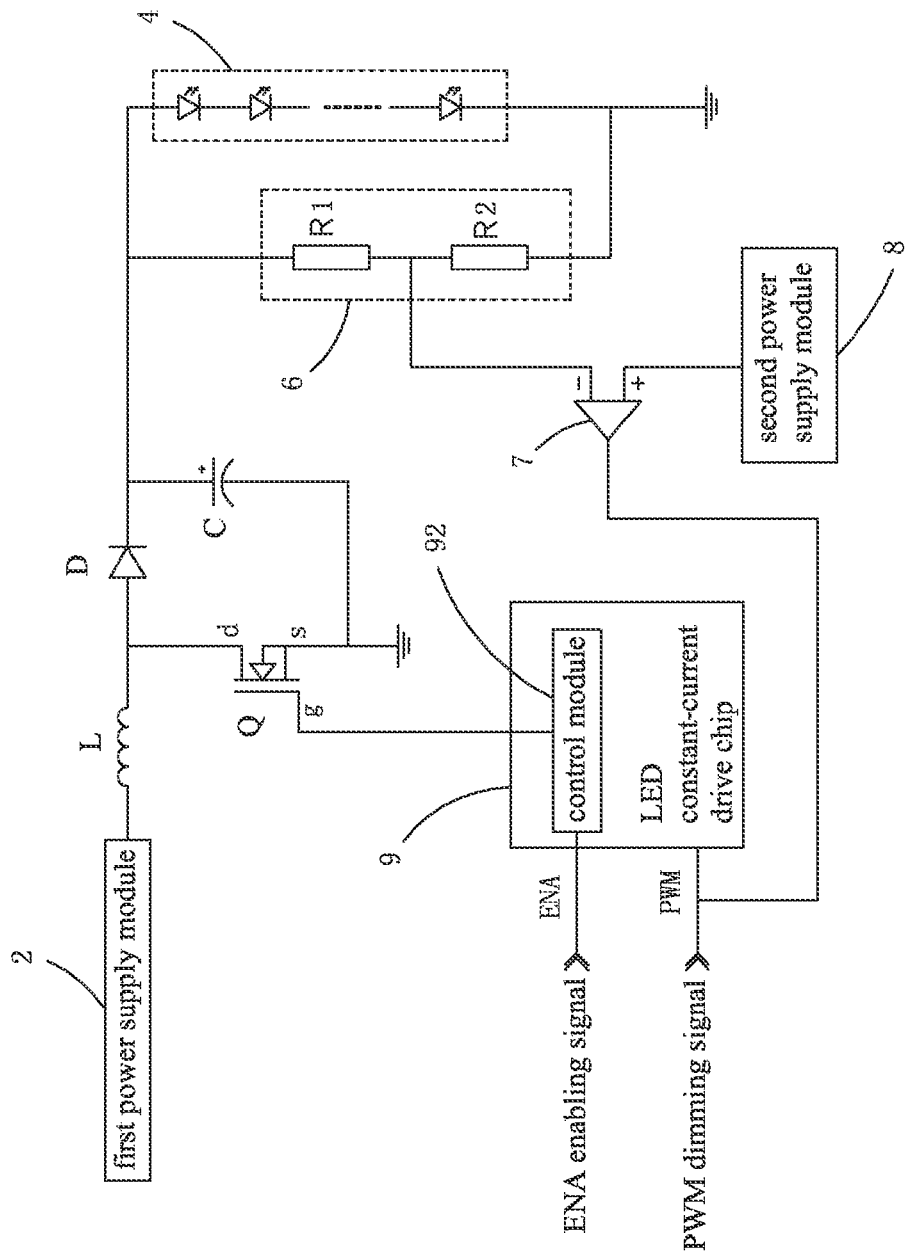
FIG. 2 is a circuit diagram of an LED backlight drive circuit according to a preferred embodiment of the present invention.

Referring to FIG. 2, an LED backlight drive circuit according to an embodiment of the present invention comprises: a first power supply module 2, an electrical inductor L, a rectifier diode D, a MOS transistor Q, an electrolytic capacitor C, an LED light string 4, a voltage division module 6, a voltage comparator 7, a second power supply module 8, and an LED constant-current drive chip 9. The electrical inductor L has an end electrically connected to the first power supply module 2 and an opposite end electrically connected to an end of the rectifier diode D and the MOS transistor Q. The rectifier diode D has an opposite end that is electrically connected to the electrolytic capacitor C, the voltage division module 6, and the LED light string 4. The MOS transistor Q has an end electrically connected to the LED constant-current drive chip 9. The voltage division module 6 is electrically connected to the voltage comparator 7 and the second power supply module 8. The MOS transistor Q, the electrolytic capacitor C, the voltage division module 6, and the LED light string 4 are electrically connected to the grounding line.

The LED constant-current drive chip 9 comprises an ENA enabling signal pin and a PWM dimming signal pin. The voltage comparator 7 comprises an output pin and the output pin is electrically connected to the PWM dimming signal pin.

Specifically, the voltage division module 6 comprises: a first electrical resistor R1 and a second electrical resistor R2. The first electrical resistor R1 has an end electrically connected to the rectifier diode D, the electrolytic capacitor, C and the LED light string 4 and an opposite end electrically connected to an end of the second electrical resistor R2 and the voltage comparator 7. The second electrical resistor R2 has an opposite end electrically connected to the grounding line. The voltage comparator 7 further comprises a positive input pin and a negative input pin. The negative input pin is electrically connected to the opposite end of the first electrical resistor R1 and the end of the second electrical resistor R2. The positive input pin is electrically connected to the second power supply module 8. The rectifier diode D comprises an anode and a cathode. The anode is electrically connected to the electrical inductor L and the MOS transistor Q and the cathode is electrically connected to the electrolytic capacitor C, the first electrical resistor R1, and the LED light string 4. The electrolytic capacitor C comprises a positive terminal and a negative terminal. The positive terminal is electrically connected to the cathode of the rectifier diode D, the first electrical resistor R1, and the LED light string 4 and the negative terminal is electrically connected to the grounding line. The MOS transistor Q comprises a gate terminal g, a source terminal s, and a drain terminal d. The drain terminal d is electrically connected to the electrical inductor L and the anode of the rectifier diode D. The gate terminal g is electrically connected to the LED constant-current drive chip 9. The source terminal s is electrically connected to the grounding line.

The second power supply module 8 supplies an output voltage that is set according to practical needs and is generated by the first power supply module 2 through resistor based voltage division. However, it is not limited to such an arrangement and the second power supply module 8 can alternatively generated by the first power supply module 2 through capacitor based voltage division. The LED constant-current drive chip 9 comprises a control module 92 integrated therein. The control module 92 functions to adjust the duty ratio D of the drive signal for the gate terminal g of the MOS transistor Q so as to adjust the level of the output voltage of the LED backlight drive circuit.

When the LED backlight drive circuit supplies an output voltage that is excessively high and exceeds a set voltage protection threshold, the voltage that the first and second electrical resistors R1, R2 supply through voltage division to the negative input pin of the voltage comparator 7 is also very high and exceeds the voltage applied by the second power supply module 8 to the positive input pin of the voltage comparator 7, whereby the voltage comparator 7 outputs a low voltage level to the PWM dimming signal pin to forcibly pull down the voltage level at the PWM dimming signal pin so that the LED constant-current drive chip 9 cannot operate normally to thereby achieve the over-voltage protection function.

Thus, with the application of the LED backlight drive circuit according to the present invention, removal of over-voltage protection module from an LED constant-current drive chip can be realized so that the size of the LED constant-current drive chip can be further reduced and the manufacture cost lowered down and the LED constant-current drive chip can be better protected against risk of being broken through by high voltage.

Figure 3:
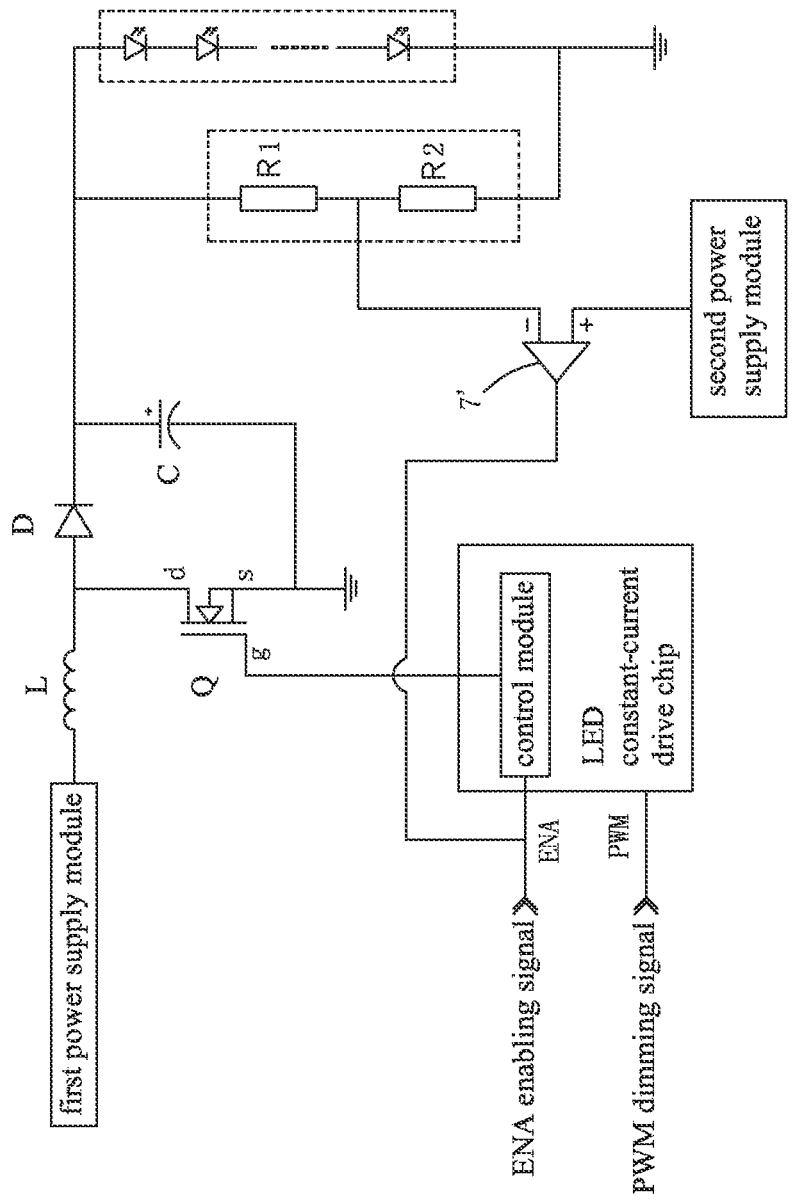
FIG. 3 is a circuit diagram of an LED backlight drive circuit according to another preferred embodiment of the present invention.

Referring to FIG. 3, an alternative preferred embodiment is provided, of which the only difference from the previous embodiment is that the output pin of the voltage comparator 7' is electrically connected to the ENA enabling signal pin of the LED constant-current drive chip, whereby when the LED backlight drive circuit supplies an output voltage that is excessively high, the voltage comparator 7' outputs a low voltage level to the ENA enabling signal pin to forcibly pull down the voltage level at the ENA enabling signal pin so that the LED constant-current drive chip cannot operate normally to thereby achieve the over-voltage protection function.

In summary, the present invention provides an LED backlight drive circuit, wherein a voltage comparator is included in an external circuit of the LED constant-current drive chip to detect the output voltage of the drive circuit, so that in case of high voltage, the voltage comparator is caused to supply a low voltage level to forcibly pull down a PWM dimming signal or an ENA enabling signal of the LED constant-current drive chip to achieve an over-voltage protection function and also enable removal of over-voltage protection module from a conventional LED constant-current drive chip, allowing the size of the LED constant-current drive chip to be further reduced and lowering down the manufacture cost and better protecting the LED constant-current drive chip against risk of being broken through by high voltage.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An LED (Light Emitting Diode) backlight drive circuit, comprising: a first power supply module, an electrical inductor, a rectifier diode, a MOS (Metal Oxide Semiconductor) transistor, an electrolytic capacitor, an LED light string, a voltage division module, a voltage comparator, a second power supply module that supplies a reference voltage, and an LED constant-current drive chip, where the voltage comparator is separate from the LED constant-current drive chip;

the electrical inductor having an end electrically connected to the first power supply module and an opposite end electrically connected to an end of the rectifier diode and the MOS transistor, the rectifier diode having an opposite end electrically connected to the electrolytic capacitor, the voltage division module, and a first end of the LED light string, the MOS transistor having an end electrically connected to the LED constant-current drive chip, the voltage division module being electrically connected to the voltage comparator and the second power supply module, the MOS transistor, the electrolytic capacitor, the voltage division module, and an opposite second end of the LED light string being electrically connected to a grounding line;

the LED constant-current drive chip comprising an ENA enabling signal pin and a PWM (Pulse Width Modulation) dimming signal pin, the voltage comparator comprising an output pin, the output pin being directly and electrically connected to one of the ENA enabling signal pin and the PWM dimming signal pin;

wherein the voltage division module comprises: a first electrical resistor and a second electrical resistor, the first electrical resistor having an end electrically connected to the rectifier diode, the electrolytic capacitor, and the first end of the LED light string and an opposite end electrically connected to an end of the second electrical resistor and the voltage comparator, the second electrical resistor having an opposite end electrically connected to the grounding line, whereby the voltage division module is connected in parallel with the LED light string to detect a voltage across the LED light string; and wherein the voltage comparator further comprises a positive input pin and a negative input pin, the negative input pin being electrically connected to the opposite end of the first electrical resistor and the end of the second electrical resistor to receive a divisional voltage of the voltage across the LED light string, the positive input pin being electrically connected to the second power supply module to receive the reference voltage so that when the divisional voltage is higher than the reference voltage, the output pin of the voltage comparator applies a low voltage level to the one of the enabling signal pin and the PWM dimming signal pin to lower down voltage received at the one of the enabling signal pin and the PWM dimming signal pin.

2. The LED backlight drive circuit as claimed in claim 1, wherein the rectifier diode comprises an anode and a cathode, the anode being electrically connected to the electrical inductor and the MOS transistor, the cathode being electrically connected to the electrolytic capacitor, the voltage division module, and the LED light string.

3. The LED backlight drive circuit as claimed in claim 1, wherein the electrolytic capacitor comprises a positive terminal and a negative terminal, the positive terminal being electrically connected to the rectifier diode, the voltage division module, and the LED light string, the negative terminal being electrically connected to the grounding line.

4. The LED backlight drive circuit as claimed in claim 1, wherein the MOS transistor comprises a gate terminal, a source terminal, and a drain terminal, the drain terminal being electrically connected to the electrical inductor and the rectifier diode, the gate terminal being electrically connected to the LED constant-current drive chip, the source terminal being electrically connected to the grounding line.

5. The LED backlight drive circuit as claimed in claim 1, wherein the second power supply module is generated by the first power supply module through resistor based voltage division.

6. The LED backlight drive circuit as claimed in claim 1, wherein the second power supply module is generated by the first power supply module through capacitor based voltage division.

7. An LED (Light Emitting Diode) backlight drive circuit, comprising: a first power supply module, an electrical inductor, a rectifier diode, a MOS (Metal Oxide Semiconductor) transistor, an electrolytic capacitor, an LED light string, a voltage division module, a voltage comparator, a second power supply module that supplies a reference voltage, and an LED constant-current drive chip, where the voltage comparator is separate from the LED constant-current drive chip;

the electrical inductor having an end electrically connected to the first power supply module and an opposite end electrically connected to an end of the rectifier diode and the MOS transistor, the rectifier diode having an opposite end electrically connected to the electrolytic capacitor, the voltage division module, and a first end of the LED light string, the MOS transistor having an end electrically connected to the LED constant-current drive chip, the voltage division module being electrically connected to the voltage comparator and the second power supply module, the MOS transistor, the electrolytic capacitor, the voltage division module, and an opposite end of the LED light string being electrically connected to a grounding line;

the LED constant-current drive chip comprising an ENA enabling signal pin and a PWM (Pulse Width Modulation) dimming signal pin, the voltage comparator comprising an output pin, the output pin being directly and electrically connected to one of the ENA enabling signal pin and the PWM dimming signal pin;

wherein the voltage division module comprises: a first electrical resistor and a second electrical resistor, the first electrical resistor having an end electrically connected to the rectifier diode, the electrolytic capacitor, and the first end of the LED light string and an opposite end electrically connected to an end of the second electrical resistor and the voltage comparator, the second electrical resistor having an opposite end electrically connected to the grounding line, whereby the voltage division module is connected in parallel with the LED light string to detect a voltage across the LED light string;

wherein the voltage comparator further comprises a positive input pin and a negative input pin, the negative input pin being electrically connected to the opposite end of the first electrical resistor and the end of the second electrical resistor to receive a divisional voltage of the voltage across the LED light string, the positive input pin being electrically connected to the second power supply module to receive the reference voltage so that when the divisional voltage is higher than the reference voltage, the output pin of the voltage comparator applies a low voltage level to the one of the enabling signal pin and the PWM dimming signal pin to lower down voltage received at the one of the enabling signal pin and the PWM dimming signal pin;

wherein the rectifier diode comprises an anode and a cathode, the anode being electrically connected to the electrical inductor and the MOS transistor, the cathode being electrically connected to the electrolytic capacitor, the voltage division module, and the LED light string;

wherein the electrolytic capacitor comprises a positive terminal and a negative terminal, the positive terminal being electrically connected to the rectifier diode, the voltage division module, and the LED light string, the negative terminal being electrically connected to the grounding line;

wherein the MOS transistor comprises a gate terminal, a source terminal, and a drain terminal, the drain terminal being electrically connected to the electrical inductor and the rectifier diode, the gate terminal being electrically connected to the LED constant-current drive chip, the source terminal being electrically connected to the grounding line; and wherein the second power supply module is generated by the first power supply module through resistor based voltage division.

* * * * *